United States Patent
Gadzinski et al.

(10) Patent No.: US 9,672,142 B2
(45) Date of Patent: Jun. 6, 2017

(54) REPLACEMENT OF SUSPECT OR MARGINALLY DEFECTIVE COMPUTING SYSTEM COMPONENTS DURING FULFILLMENT TEST OF BUILD-TO-ORDER TEST PHASE

(71) Applicant: INTERNATIONAL BUSINESS MACHINES CORPORATION, Armonk, NY (US)

(72) Inventors: Matthew Gadzinski, Marlboro, NY (US); Anthony G. Gorey, Fishkill, NY (US); Richard W. Gregory, Poughkeepsie, NY (US); Rohan A. Jones, Poughkeepsie, NY (US); Michel H. Joseph, Poughkeepsie, NY (US); Kurt J. Leuchten, Poughkeepsie, NY (US); Gerald G. Stanquist, Salt Point, NY (US); Brian W. Stocker, Port Ewen, NY (US)

(73) Assignee: International Business Machines Corporation, Armonk, NY (US)

( * ) Notice: Subject to any disclaimer, the term of this patent is extended or adjusted under 35 U.S.C. 154(b) by 1036 days.

(21) Appl. No.: 13/911,328

(22) Filed: Jun. 6, 2013

(65) Prior Publication Data

US 2014/0364984 A1 Dec. 11, 2014

(51) Int. Cl.
*G06F 11/00* (2006.01)
*G06F 11/36* (2006.01)

(52) U.S. Cl.
CPC .......... *G06F 11/3692* (2013.01); *Y02P 90/04* (2015.11); *Y02P 90/14* (2015.11); *Y02P 90/20* (2015.11)

(58) Field of Classification Search
CPC .................................................. G06F 11/3692
See application file for complete search history.

(56) References Cited

U.S. PATENT DOCUMENTS

| | | | | |
|---|---|---|---|---|
| 6,598,223 | B1 * | 7/2003 | Vrhel, Jr. | G06F 8/61 717/168 |
| 6,711,798 | B2 * | 3/2004 | Brown | G05B 19/00 198/346.2 |

(Continued)

FOREIGN PATENT DOCUMENTS

| | | |
|---|---|---|
| CN | 101980264 | 2/2011 |
| JP | 2009068946 | 4/2009 |
| JP | 2009117609 | 5/2009 |

OTHER PUBLICATIONS

Dworak, J.et al; "Defect-oriented testing and defective-part-level prediction," Design & Test of Computers, IEEE , vol. 18, No. 1, pp. 31-41, Jan./Feb. 2001 doi: 10.1109/54.902820.

Andersson, C. et al; "Investigating Test Teams' Defect Detection in Function test," Empirical Software Engineering and Measurement, 2007. ESEM 2007. First International Symposium on , vol., No., pp. 458-460, Sep. 20-21, 2007 doi: 10.1109/ESEM.2007.68.

*Primary Examiner* — Christopher McCarthy
(74) *Attorney, Agent, or Firm* — Damion Josephs

(57) ABSTRACT

A fulfillment test of a computing system having components is performed within a build-to-order test phase. Responsive to the fulfillment test failing, the component that most contributed to the fulfillment test failing is replaced, regardless of whether the given component was determined to be suspect or marginally defective pursuant to a fabrication test previously performed within a build-to-plan test phase. Any other component of that contributed to the fulfillment test failing and that was determined to be suspect or marginally defective pursuant to the fabrication test previously performed within the build-to-plan test phase is also replaced.

14 Claims, 4 Drawing Sheets

(56) References Cited

U.S. PATENT DOCUMENTS

| | | | |
|---|---|---|---|
| 6,735,757 B1* | 5/2004 | Kroening | G06F 8/63 717/120 |
| 6,832,435 B2* | 12/2004 | Sanders | G05B 19/00 29/705 |
| 7,698,013 B2 | 4/2010 | Honda et al. | |
| 2002/0091456 A1* | 7/2002 | O'Connor | G06Q 10/087 700/97 |
| 2003/0097315 A1 | 5/2003 | Guerrero et al. | |
| 2005/0027487 A1 | 2/2005 | Iyer | |
| 2005/0209723 A1 | 9/2005 | Cosci et al. | |
| 2006/0195208 A1* | 8/2006 | Sammer | G06F 11/006 700/97 |
| 2007/0194779 A1* | 8/2007 | Eldridge | G01R 1/07314 324/160 |
| 2007/0299731 A1* | 12/2007 | Erickson | G06Q 10/06 705/26.81 |
| 2010/0083029 A1* | 4/2010 | Erickson | G06F 11/0709 714/2 |
| 2011/0015898 A1 | 1/2011 | Klippel | |
| 2012/0053877 A1 | 3/2012 | Bergeret et al. | |
| 2012/0075944 A1 | 3/2012 | Ide et al. | |
| 2014/0297234 A1* | 10/2014 | Garzon | G06F 11/00 703/2 |
| 2016/0042422 A1* | 2/2016 | Sahawneh | G05B 19/41865 705/26.5 |

* cited by examiner

REPLACEMENT OF SUSPECT OR MARGINALLY DEFECTIVE COMPUTING SYSTEM COMPONENTS DURING FULFILLMENT TEST OF BUILD-TO-ORDER TEST PHASE

BACKGROUND

Server computing devices have become the lifeblood of many organizations. For large organizations like business enterprises and governmental concerns, servers can be quite sophisticated and large pieces of hardware, involving many different components assembled in a dizzying number of particular configurations. As computing needs have grown, such organizations have purchased more and more servers, both to replace outdated existing servers and supplement existing servers with increased capacity.

SUMMARY

An example method includes performing the following responsive to a fulfillment test of a computing system within a build-to-order test phase failing. The computing system includes components. A given component that most contributed to the fulfillment test failing is replaced, regardless of whether the given component was determined to be suspect or marginally defective pursuant to a fabrication test previously performed within a build-to-plan test phase. Any other component that contributed to the fulfillment test failing and that was determined to be suspect or marginally defective pursuant to the fabrication test previously performed within the build-to-plan test phase is also replaced.

An example storage device stores computer-readable code executable by one or more computing devices to perform a method. The method includes performing a fulfillment test of a computing system within a build-to-order phase. The computing system includes components. The method includes, responsive to the fulfillment test failing, performing the following. Those components that contributed to the fulfillment test failing are determined. A given component that most contributed to the fulfillment test failing is recommended for replacement within the computing system. For each component of one or more other components that contributed to the fulfillment test failing, whether the other component was denoted as suspect or marginally defective pursuant to a fabrication test previously performed within a build-to-plan test phase is determined. Responsive to determining that the other component was denoted as suspect or marginally defective, the given other component is recommended for replacement within the computing system.

An example system includes a database to store, for each of a number of components, a testing history thereof. The example system includes one or more computing devices communicatively connectable to one another. The example system includes a build-to-order test phase module of the one or more computing devices. The build-to-order test phase module is to perform within a build-to-order test phase a fulfillment test of a computing system having first components selected from the components in accordance with a customer order. The build-to-order test phase module is to, responsive to the fulfillment test failing, recommend that a given first component that most contributed to the fulfillment test failing be replaced within the computing system. The build-to-order test phase module is to, responsive to the fulfillment test failing, recommend that any other first component that contributed to the fulfillment test failing be replaced within the computing system only if it is or they are denoted within the database as suspect or marginally defective pursuant to the testing history thereof stored in the database.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

Figure 1:
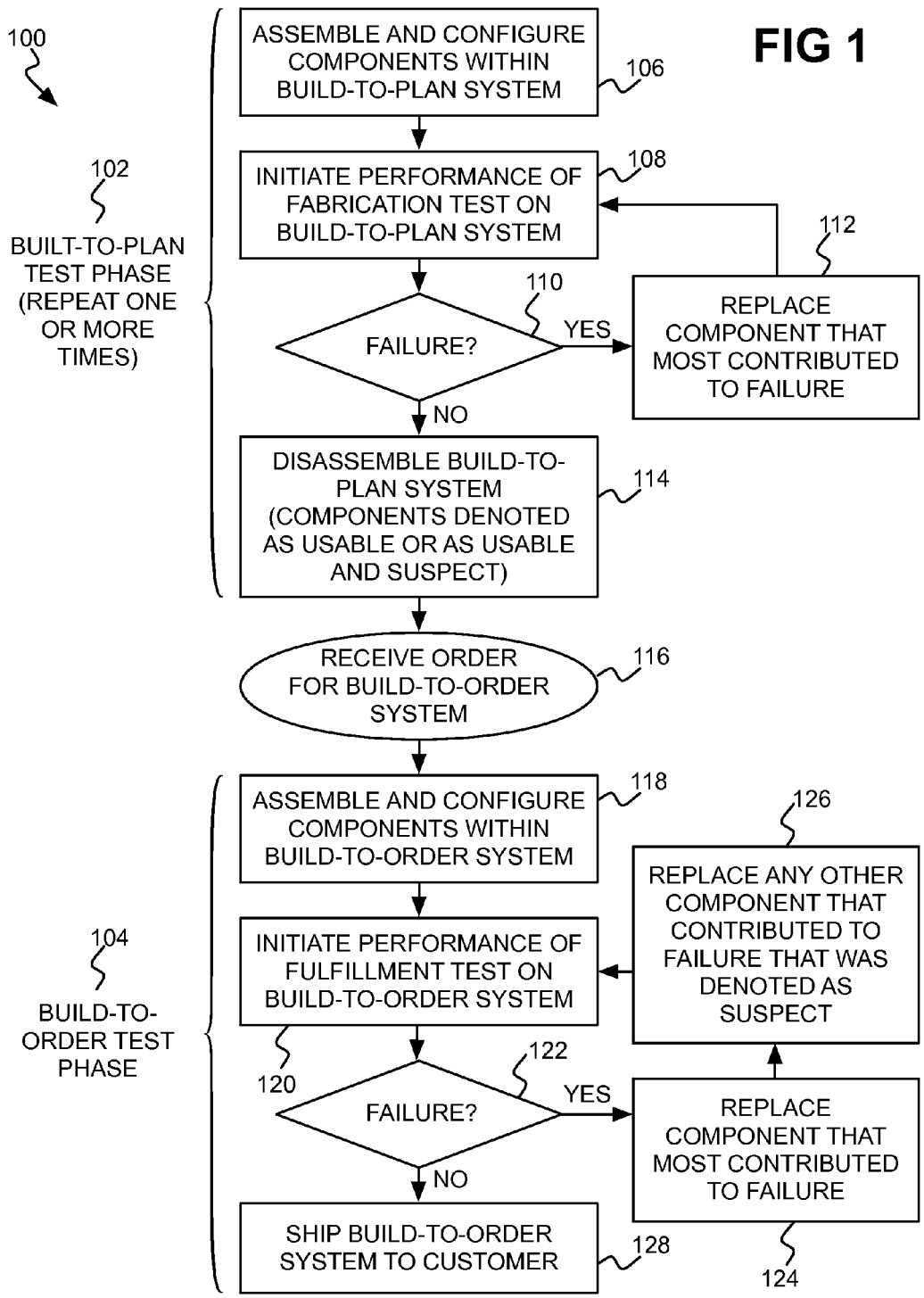
FIG. 1 is a flowchart of an example method of a build-to-plan test phase and a build-to-order test phase, as performed by one or more users.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, organizations employ sophisticated server computing devices. Such servers are generally not purchased "off the shelf," but rather are the subject of contracts with manufacturers who can customize servers to the organizations' needs and specifications in a bespoke manner. Server manufacture many times is performed under tight schedules, to meet both customer demands as well as internal manufacturer metrics.

Such high-end server manufacture can require lengthy and complex testing processes to be performed to ensure that the servers delivered to organizations will operate correctly and without failure. These testing processes are frequently divided into two types of tests: a fabrication test within a build-to-plan test phase and a fulfillment test within a build-to-order test phase. In the former phase, parts that will be employed to satisfy individual customer orders are fabrication tested, on a per-part basis, on an assembly-of-parts basis, and on an anticipated-usage basis. The former phase can be performed before an actual customer order has arrived for fulfillment. In the latter phase, these previously tested parts and assemblies thereof are then used to build an actually ordered server per a customer order's specifications, and the resulting server fulfillment tested.

In the typical build-to-plan test phase, parts may be assembled and configured within one or more build-to-plan computing systems, and the computing systems fabrication tested in what are referred to as individual test sectors. If a build-to-plan computing system fails fabrication testing, analysis is performed to determine the parts that contributed to the failure. The part that most contributed to the failure is replaced, and the fabrication test rerun. If the build-to-plan computing system then passes fabrication testing, its current constituent parts are removed from the computing system, and marked or tagged as acceptable for inclusion within a subsequently constructed build-to-order computing system to fulfill a customer order. This is the case even if some of the parts had been deemed as contributing to the earlier failure of the build-to-plan computing system, albeit not the primary contributors to this failure. Such parts are referred to as being suspect or marginally defective.

Conventionally, this process is basically repeated in the subsequent build-to-order test phase once a customer order is received. Parts that were part of successfully tested build-to-plan computing systems are assembled and configured within a build-to-order computing system in accordance with a customer order for this system. If the build-to-order computing system fails fulfillment testing, analysis is performed to determine the parts that contributed to the failure. The part that most contributed to the failure is replaced, and the fabrication test rerun. If the build-to-order computing system then passes fulfillment testing, the computing system is shipped to the customer that placed the order for this computing system.

Suspect or marginally defective parts can thus be components of build-to-order computing systems ultimately shipped to customers in satisfaction of customer orders. This may not be an issue if these suspect parts did not contribute to fulfillment test failure of a build-to-order computing system. However, if the suspect parts did contribute to fulfillment test failure, albeit not primarily contributing to this failure, their inclusion within a build-to-order computing system shipped to a customer can be problematic. For instance, the computing system may experience premature failure in the field, at the customer site. Besides increasing warranty service costs for the manufacturer, such on-site failure can result in customer dissatisfaction with the manufacturer.

Disclosed herein are techniques for ameliorating these types of problems. Specifically, any suspect or marginally defective parts that contribute to a build-to-order computing system failing fulfillment testing are replaced. That is, parts that had contributed to a build-to-plan computing system failing fabrication testing but that were not the primary contributors to the failure are replaced if they contribute to a build-to-order computing system failing fulfillment testing regardless of whether they are the primary contributors to the failure. As such, a potential premature failure vector for build-to-order computing systems failing after having been shipped to customers is eliminated, which is likely to lead to decreased warranty service costs of and increased customer satisfaction with the manufacturer.

In the techniques disclosed herein, a part that most contributes to a build-to-order computing system failing fulfillment testing during the build-to-order test phase is replaced regardless of whether the part had previously contributed in any way to a build-to-plan computing system failing fabrication testing during the build-to-plan test phase. That is, such a part is replaced regardless of whether the part was previously tagged as suspect or marginally defective. A part that contributes to a build-to-order computing system failing fulfillment testing but that is not the primary contributor to the failure is replaced if it previously had contributed in any way to a build-to-plan computing system failing fabrication testing during the build-to-plan test phase. That is, such a part is replaced if the part was previously tagged as suspect or marginally defective.

By comparison, two types of parts are not replaced when a build-to-order computing system fails fulfillment testing during the build-to-order test phase. First, parts previously tagged as suspect or marginally defective parts but that did not contribute in any way to fulfillment test failure are not replaced. That is, a part that had previously contributed in any way to a build-to-plan computing system failing fabrication testing during the build-to-plan test phase is not replaced when a build-to-order computing system fails fulfillment testing during the build-to-order test phase if it did not contribute in any way to the latter failure.

Second, parts that have not been previously tagged as suspect or marginally defective parts are not replaced even if they contribute to fulfillment test failure, so long as they are not the primary contributors to this failure. That is, a part that had not previously contributed in any way to a build-to-plan computing system failing fabrication testing during the build-to-plan test phase is not replaced when a build-to-order computing system fails fulfillment testing during the build-to-order test phase even if it did contribute to the latter failure. This is the case only so long as the part was not the primary contributor to such failure.

FIG. 1 shows an example method 100 of a build-to-plan test phase 102 and a build-to-order test phase 104 in accordance with these techniques. The build-to-plan test phase 102 can be repeated one or more times across multiple test sectors that perform different types of fabrication testing. Components are assembled and configured within a build-to-plan computing system (106). These components are hardware elements, such as processors, processor sub-assemblies, storage devices, storage device sub-assemblies, memory, memory sub-assemblies, and so on. The computing system itself may be a separate server computing device, for example.

Performance of a fabrication test within a test sector is initiated on the build-to-plan computing system (108). The fabrication test may fail or succeed. Responsive to the build-to-plan computing system failing the fabrication test (110), just the component thereof that most contributed to the failure is replaced (112), and the computing system with the new component is again fabrication tested (108). Once the build-to-plan computing system passes the fabrication test (110), the computing system is disassembled (114), so that its components can be later used in the build-to-order test phase 104 within an actual build-to-order computing system to fulfill a customer order.

The components of the build-to-plan computing system that have not been replaced can include two different types. The first type of component is one that did not contribute in any way to any failure of the fabrication test. These components are denoted as usable within an actual build-to-order computing system. The second type of component is one that did contribute to a failure of the fabrication test, but that was not the primary contributor to the failure and therefore was not replaced. These components are also denoted as usable within an actual build-to-order computing system, but are further denoted as being suspect or marginally defective.

At some point, a customer order for a build-to-order computing system is received from a customer (116). At this time, the build-to-order test phase 104 commences; the build-to-order test phase 104 does not begin until the customer order has been received. Components are assembled and configured within the build-to-order computing system in accordance with the customer order (118). The components are selected from the components that have been denoted as usable within the build-to-plan test phase 102, and can include components that have also been denoted as being suspect or marginally defective.

Performance of a fulfillment test is initiated on the build-to-order computing system (120). The fulfillment test may fail or succeed. Responsive to the build-to-order computing system failing the fulfillment test (122), the component that most contributed to the failure is replaced (124), regardless of whether this component was previously denoted as being suspect or not. Furthermore, however, any other component that contributed to the failure that was previously denoted as being suspect or marginally defective is also replaced (126), and the build-to-order computing system with the new component(s) is again fulfillment tested (120). It is noted that components that were previously denoted as being suspect but that did not contribute to the fulfillment test failure, and components that were not previously denoted as being suspect but that did contribute to the fulfillment test failure albeit not as the primary contributor of such a failure, are not replaced.

Once the build-to-order computing system passes the fulfillment test (122), the computing system can be shipped to the customer that placed the customer order in question (128). The build-to-order computing system thus only includes components that were denoted as usable in the build-to-plan test phase. The build-to-order computing system does not include any component that was denoted as suspect or marginally defective in the build-to-plan test phase, if such a component contributed in any way whatsoever to a fulfillment test failure of the build-to-order computing system. The build-to-order computing system does not include any component that most contributed to a fulfillment test failure, regardless of whether such a component was previously denoted as suspect in the build-to-plan test phase. The build-to-order computing system can, however, include a component that was denoted as suspect in the build-to-plan test phase, if the component did not contribute in any way to a fulfillment test failure of the build-to-order computing system.

Figure 2:
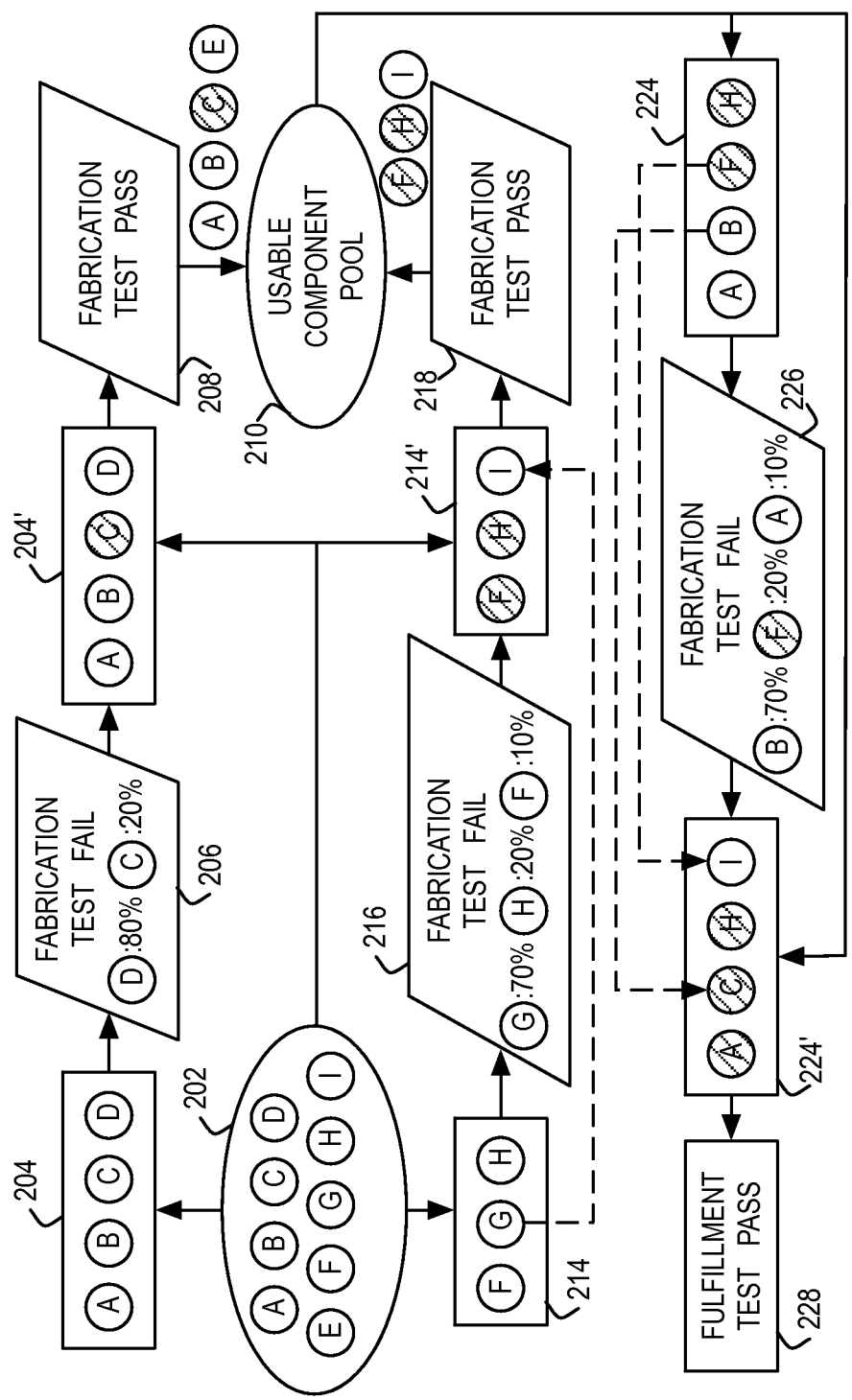
FIG. 2 is a diagram of an illustrative example of the method of FIG. 1.

FIG. 2 shows an illustrative example of the techniques that have been described in relation to the method 100. A pool of components 202 includes components A, B, C, D, E, F, G, H, and I. These components are new, and have not yet been tested. As such, the components have to pass fabrication testing in the build-to-plan phase before they can be denoted as usable within a build-to-order system in the build-to-order phase.

A build-to-plan computing system 204 including components A, B, C, and D is assembled, configured, and subjected to fabrication testing in the build-to-plan phase. The computing system 204 fails fabrication testing, as indicated in 206, where component D was 80% of the cause of the failure, and component C was 20% of the cause of the failure. Therefore, just component D is replaced, as the component most contributing to fabrication test failure, with component E from the pool 202, yielding the modified build-to-plan computing system 204'. Component C is shaded in the computing system 204' to indicate its status as being suspect or marginally defective. The computing system 204' then passes fabrication testing, as indicated in 208. Therefore, components A, B, C, and E of the computing system 204' are added to a pool of usable components 210, from which a build-to-order system can be constructed in the build-to-order phase.

Another build-to-plan computing system 214 including components F, G, and H is assembled, configured, and subjected to fabrication testing in the build-to-plan phase. The computing system 214 fails fabrication testing, as indicated in 216, where component G was 70% of the cause of the failure, component H was 20% of the cause of the failure, and component F was 10% of the cause of the failure. Therefore, just component G is replaced, as the component most contributing to fabrication test failure, with component I from the pool 202, yielding the modified build-to-plan computing system 214'. Components F and H are shaded in the computing system 214' to indicate their status as being suspect or marginally defective. The computing system 214' then passes fabrication testing, as indicated in 218. Therefore, components F, H, and I of the computing system 214' are added to the pool of usable components 210.

In the subsequent build-to-order phase, a build-to-order computing system 224 is assembled and configured to include components A, B, F, and H from the pool 210, in accordance with a customer order. Components F and H were previously denoted as being suspect or marginally defective. The computing system 224 fails fulfillment testing, as indicated in 226, where component B was 60% of the cause of the failure, component F was 30% of the cause of the failure, and component A was 10% of the cause of the failure.

Component B is replaced with component C, even though component B was not previously denoted as being suspect or marginally defective, because component B most contributed to fulfillment test failure. Component B is replaced by a component from the pool 210, component C, which was previously denoted as being suspect or marginally defective, but this is permissible. Component F is replaced with component I from the pool 210, even though component F did not contribute most to fulfillment test failure, because component F was previously denoted as being suspect or marginally. Component A is not replaced, even though component A contributed to fulfillment test failure, because component A did not most contribute to the failure and also was not previously denoted as being suspect or marginally defective. Component H is not replaced, even though component H was previously denoted as being suspect or marginally defective, because it did not contribute at all to fulfillment test failure.

The resulting modified build-to-order computing system 224' is again subjected to fulfillment testing. Component A is now indicated as being suspect or marginally defective, by shading, because component A had contributed to fulfillment test failure of the (original) build-to-order computing system 224. The modified computing system 224 passes fulfillment testing, as indicated in 228. Therefore, the computing system 224', including components A, C, H, and I, can be shipped to the customer that placed the customer order in accordance with which the original computing system 224 was assembled, configured, and fulfillment tested. The computing system 224' still includes suspect or marginally defective components, specifically components A, C, and H. However, the computing system 224' does not include any component that contributed in any way to fulfillment test failure in the build-to-order phase that was previously denoted as being suspect or marginally defective in the build-to-plan phase.

The method 100 that has been described, an illustrative example of which has been presented in FIG. 2, is performed by one or more users, typically at the manufacturer's factory site. However, the actual testing itself, including both the fabrication testing and the fulfillment testing, is performed by one or more computing devices at the manufacturer. These computing devices are under control of such users, who may be factory personnel, for instance.

Figure 3:
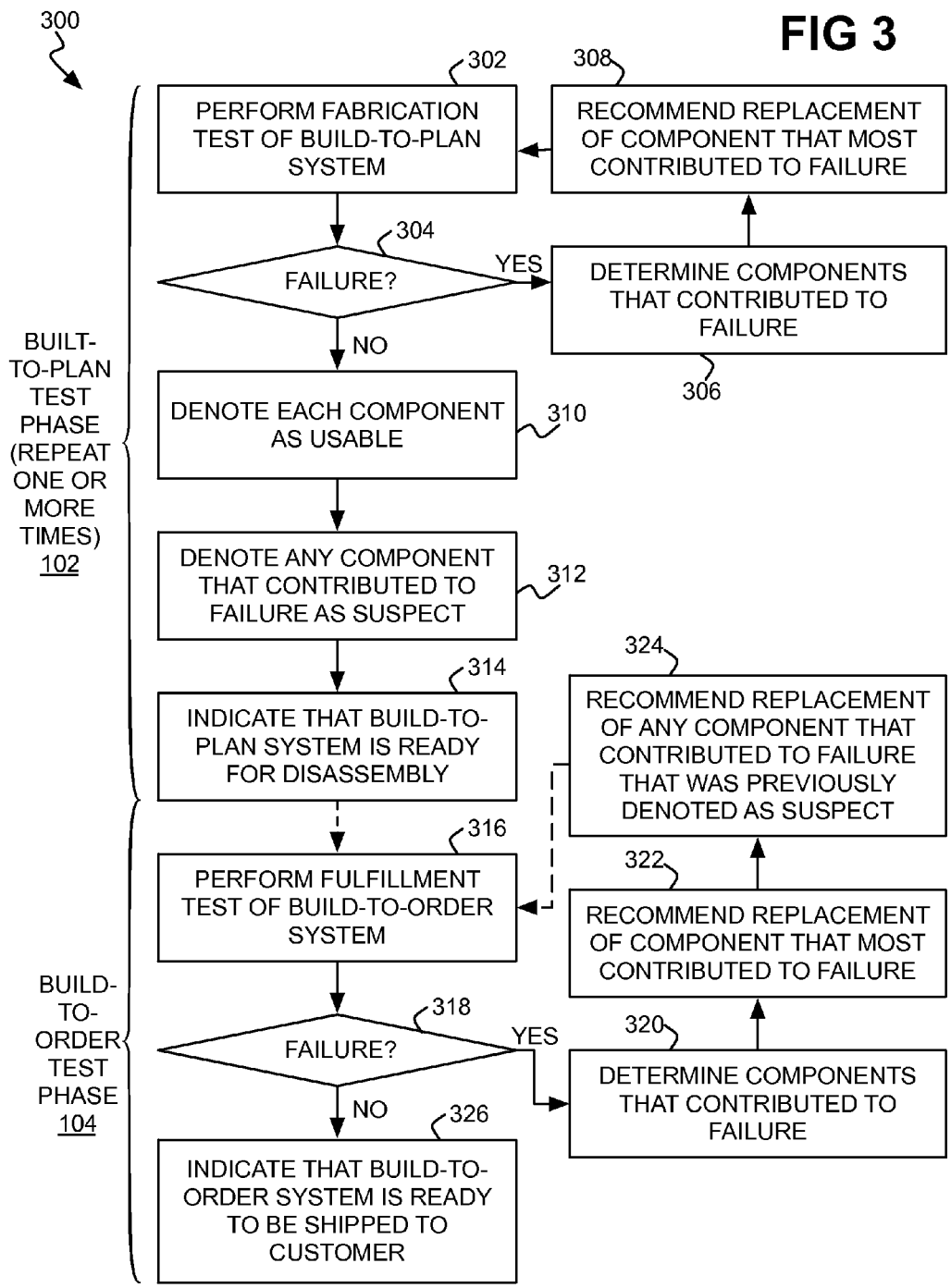
FIG. 3 is a flowchart of an example method of a build-to-plan test phase and a build-to-order test phase, as performed by one or more computing devices.

FIG. 3 shows a method 300 performed by these computing devices to perform the build-to-plan test phase 102 and the built-to-order test phase 104. The method 300 may be implemented as one or more computer programs including computer-executable code that are executed by processor of the computing devices. The programs themselves may be stored on storage devices, including volatile and non-volatile storage devices such as semiconductor memory and hard disk drives, for instance.

In the build-to-plan phase, the computing devices perform a fabrication test of a build-to-plan computing system (302) that has been assembled and configured. If the fabrication test fails (304), then the computing devices determine the components of the computing system that contributed to the failure (306), and recommend replacement of just the component of the build-to-plan system that most contributed to the failure (308). Assuming that a user replaces the component and reinitiates the fabrication test, the computing devices then re-perform the fabrication test on the modified build-to-plan computing system (302).

At some point, the fabrication test does not fail (304), at which time the computing devices denote each component currently part of the build-to-plan computing system as usable within a subsequently assembled build-to-order computing system (310). For instance, each such component may be marked as having passed the fabrication test by updating a corresponding entry within a test database to which the computing devices are communicatively connected. Furthermore, the computing devices denote any component currently part of the build-to-plan computing system that contributed to any failure of the build-to-plan system as suspect or marginally defective (312), such as by updating a corresponding entry within the test database in question. However, such components are still denoted as being usable.

The computing devices then indicate that the build-to-plan computing system is ready for disassembly (314), so that the computing system's constituent parts can be removed from the system and stocked as ready to use within a subsequently constructed build-to-order computing system. At some point thereafter, a customer order is received, and a build-to-order computing system is assembled and configured by the user(s). At this time, the build-to-order test phase 104 is entered via the computing devices performing the fulfillment test of the build-to-order system (316) that has been assembled and configured.

If the fulfillment test fails (318), then the computing devices determine the components of the build-to-order computing system that contributed to the computing system failing the fulfillment test (320). The computing devices recommend that the component which most contributed to the failure be replaced (322). The computing devices also recommend replacement of any other component of the build-to-order computing system that contributed to the failure and that was previously denoted as suspect or marginally defective within the build-to-plan test phase 102 pursuant to a fabrication test failure (324).

Specifically, for each component that contributed to the failure of the fulfillment test other than the component that most contributed thereto, which has already been recommended for replacement, the computing devices determine whether the component was previously denoted as suspect or marginally defective. For instance, the computing devices may look up this information in the test database. If the computing devices determine that the component was previously denoted as suspect or marginally defective as having contributed in a non-primary way to the prior failure of a fabrication test, then the computing devices recommend that this component be replaced within the build-to-order computing system. This is the case even though the component was not primarily responsible for the failure of the fulfillment test.

Assuming that the users adhere to the recommendations and replace the components that have been recommended for replacement, the users re-initiate the fulfillment test of the modified build-to-order computing system, which the computing devices perform (316). At some point, the build-to-order computing system does not fail the fulfillment test (318). At that time, the computing devices indicate that the build-to-order computing system has passed the fulfillment test, and is ready to be shipped to the customer that placed the customer order in accordance with which the build-to-order computing system was initially assembled and configured (326).

Figure 4:
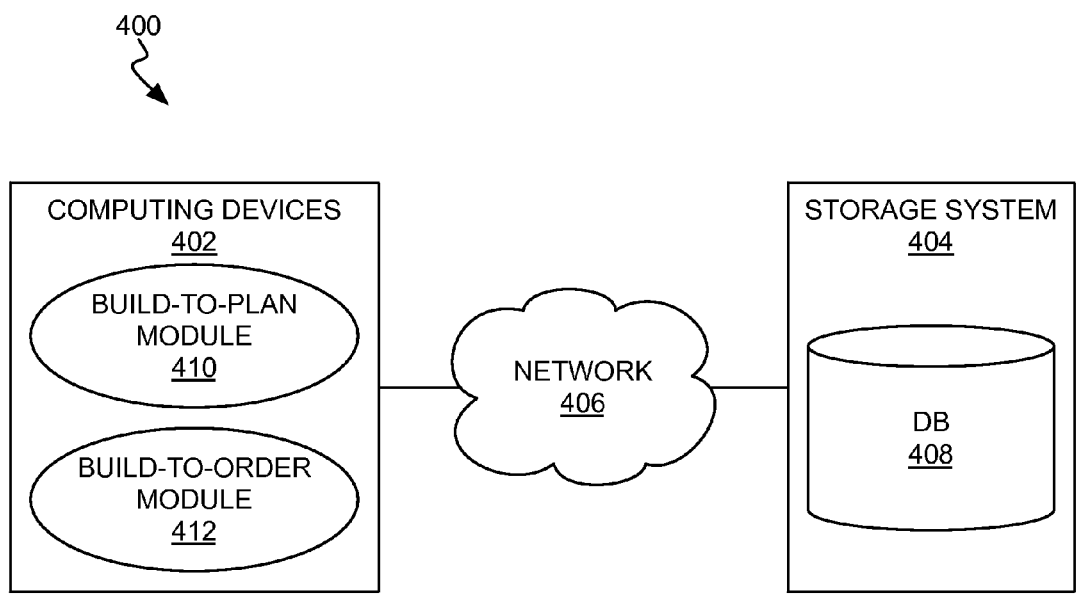
FIG. 4 is a flowchart of an example system in which the method of FIG. 3 may be performed.

FIG. 4 shows an example system 400 by which the techniques that have been disclosed can be implemented. The system 400 includes one or more computing devices 402, a storage system 404, and a network 406 communicatively interconnecting the devices 402 with the storage system 404. The network 406 can be or include a local-area network (LAN), a wide-area network (WAN), a wired network, a wireless network, and so on. The storage system 404 stores a test database 408 of the testing history of the components that the computing devices 402 test. The system 400 can include other devices, in addition to and/or in lieu of those depicted in FIG. 4.

The computing devices 402 implement a build-to-plan test phase module 410 and a build-to-order test phase module 412. The modules 410 and 412 can be implemented as software and/or hardware. For instance, in the former case, the modules 410 and 412 may be implemented as one or more computer programs stored on storage devices of the computing devices 402—or on the storage system 404 itself—and executed by processors of the devices 402.

The build-to-plan test phase module 410 performs the build-to-plan test phase 102 that has been described in relation to one or more build-to-plan computing systems including components that are to be tested for potential inclusion within subsequently constructed build-to-order computing systems. As such, the build-to-plan test phase module 410 performs parts 302 through 314 of the method 300 that has been described. The build-to-order test phase module 412 performs the build-to-order test phase 104 that has been described in relation to a build-to-order computing system including the components that have previously passed the build-to-plan test phase 102. As such, the build-to-order test phase module 412 performs parts 316 through 326 of the method 300 that has been described. In performing the test phases 102 and 104, the modules 410 and 412 update and reference the test history of the components within the test database 408.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   prior to receiving a customer order, initiating performance of the fabrication test on a build-to-plan computing system within a build-to-plan test phase, the build-to-plan computing system comprising a plurality of first components;
   responsive to the fabrication test failing, replacing a particular first component of the build-to-plan computing system that most contributed to the fabrication test failing, and initiating the performance of the fabrication test of the build-to-plan computing system again;

responsive to a fulfillment test of a build-to-order computing system within a build-to-order test phase failing, the build-to-order computing system comprising a plurality of second components, at least one second component also being one of the first components of the build-to-plan computing system, performing:

replacing a given component of the second components that most contributed to the fulfillment test failing, regardless of whether the given component was determined to be suspect or marginally defective pursuant to the fabrication test previously performed within the build-to-plan test phase; and replacing any other component of the second components that contributed to the fulfillment test failing and that was determined to be suspect or marginally defective pursuant to the fabrication test previously performed within the build-to-plan test phase.

2. The method of claim 1, further comprising, after replacing the given component and the any other component:

initiating performance of the fulfillment test of the build-to-order computing system again; and responsive to the fulfillment test passing, shipping the build-to-order computing system pursuant in accordance with the customer order, the build-to-order test phase having been started only after the customer order was received.

3. The method of claim 1, further comprising:

responsive to the fabrication test passing, performing:

disassembling the build-to-plan computing system, where each first component of the build-to-plan computing system upon the fabrication test passing is denoted as usable within the build-to-order computing system; and initiating first performance of the fulfillment test of the build-to-order computing system after receiving the customer order and after the build-to-order computing system has been built.

4. The method of claim 3, wherein, responsive to the fabrication test failing, any other first component that contributed to the fabrication test failing is denoted as suspect or marginally defective, but the any other first component is still denoted as usable within the build-to-order computing system.

5. The method of claim 1, wherein the second components of the build-to-order computing system are hardware elements of the build-to-order computing system arranged in a configuration in accordance with the customer order for the build-to-order computing system.

6. A non-transitory storage device storing computer-readable code executable by one or more computing devices to perform a method comprising:

prior to a customer order having been received, performing a fabrication test on a build-to-plan computing system within the build-to-plan test phase, the build-to-plan computing system comprising a plurality of first components;

responsive to the fabrication test failing, performing:

determining a sub-plurality of the plurality of first components that contributed to the fabrication test failing; and recommending that a given first component of the sub-plurality of first components that most contributed to the fabrication test failing be replaced within the build-to-plan computing system;

performing a fulfillment test of a build-to-order computing system within a build-to-order phase, the build-to-order computing system comprising a plurality of second components, at least one second component also being one of the first components of the build-to-plan computing system;

responsive to the fulfillment test failing, performing:

determining a sub-plurality of the plurality of second components that contributed to the fulfillment test failing;

recommending that a given component of the sub-plurality of second components that most contributed to the fulfillment test failing be replaced within the build-to-order computing system;

for each component of one or more other components of the sub-plurality of second components that contributed to the fulfillment test failing, as a given other component:

determining whether the given other component was denoted as suspect or marginally defective pursuant to the fabrication test previously performed within the build-to-plan test phase; and responsive to determining that the given other component was denoted as suspect or marginally defective, recommending that the given other component be replaced within the build-to-order computing system.

7. The non-transitory storage device of claim 6, wherein the method further comprises:

performing the fulfillment test of the build-to-order computing system again after the given component and the one or more other components have been replaced; and responsive to the fulfillment test passing, indicating that the build-to-order computing system is ready to be shipped in accordance with the customer order, the build-to-order phase having been started only after the customer order was received.

8. The non-transitory storage device of claim 6, wherein the method further comprises: responsive to the fabrication test passing, performing: denoting each first component of the build-to-plan computing system upon the fabrication test passing as usable within the build-to-order computing system; and indicating that the build-to-plan computing system is ready to be disassembled, wherein the fulfillment test of the build-to-order computing system is performed after the customer order has been received and after the build-to-order computing system has been built.

9. The non-transitory storage device of claim 8, wherein the method further comprises:

responsive to the fabrication test failing, denoting any other first component of the sub-plurality of the first components that contributed to the fabrication test failing as suspect or marginally defective, wherein the any other first component is still denoted as usable within the build-to-order computing system.

10. The non-transitory storage device of claim 9, wherein determining whether the given other component was denoted as suspect or marginally defective comprises looking up the given other component within a test database, wherein denoting each first component of the build-to-plan computing system upon the fabrication test passing as usable comprises updating an entry within the test database for each first component of the build-to-plan computing system, and wherein denoting the any other first component that contributed to the fabrication test failing as suspect or marginally defective comprises updating an entry within the test database for the any other first component.

11. A system comprising:

a database to store, for each of a plurality of components, a testing history thereof;

one or more computing devices communicatively connectable to one another;

a build-to-order test phase module of the one or more computing devices to:
  perform within a build-to-order test phase a fulfillment test of a build-to-order computing system comprising a plurality of first components selected from the components in accordance with a customer order;
  responsive to the fulfillment test failing, recommend that a given first component of the first components that most contributed to the fulfillment test failing be replaced within the build-to-order computing system; and
  responsive to the fulfillment test failing, recommend that any other first component of the first components that contributed to the fulfillment test failing be replaced within the build-to-order computing system only if the any other first component is denoted within the database as suspect or marginally defective pursuant to the testing history thereof stored in the database; and a build-to-plan test phase module of the one or more computing devices to:
  prior to the customer order having been received, perform within a build-to-plan test phase a fabrication test of a build-to-plan computing system comprising a plurality of second components, at least one second component also being one of the first components of the build-to-order computing system; and
  responsive to the fabrication test failing, recommend that a given second component of the second components that most contributed to the fabrication test failing be replaced within the build-to-plan computing system.

12. The system of claim 11, wherein the build-to-order test phase module is further to:
  perform the fulfillment test of the build-to-order computing system again after at least the given first component has been replaced; and
  responsive to the fulfillment test passing, indicating that the build-to-order computing system is ready to be shipped in accordance with the customer order, the build-to-order test phase having been started only after the customer order was received.

13. The system of claim 11, wherein the build-to-plan test phase module is further to:
  denote each second component of the build-to-plan computing system upon the fabrication test passing as usable, within the test history thereof stored in the database; and
  indicate that the build-to-plan computing system is ready to be disassembled,
  wherein the build-to-order test phase module is to perform the fulfillment test of the build-to-order computing system after the customer order has been received and after the build-to-order computing system has been built.

14. The system of claim 11, wherein the build-to-plan test phase module is further to:
  responsive to the fabrication test failing, denote any other second component of the build-to-plan computing system that contributed to the fabrication test failing as suspect or marginally defective but still usable, within the test history thereof stored in the database.

* * * * *